United States Patent
Blum

(10) Patent No.: US 6,869,117 B1
(45) Date of Patent: Mar. 22, 2005

(54) MAGNETIC LOCKING TONGS

(76) Inventor: Alvin S. Blum, 2350 Del Mar Place, Fort Lauderdale, FL (US) 33301

( * ) Notice: Subject to any disclaimer, the term of this patent is extended or adjusted under 35 U.S.C. 154(b) by 0 days.

(21) Appl. No.: 10/886,199

(22) Filed: Jul. 7, 2004

(51) Int. Cl.$^7$ ............................. A47G 21/10; A47J 43/28
(52) U.S. Cl. ........................... 294/16; 294/99.2; 294/106
(58) Field of Search ................................ 294/3, 8.5, 11, 294/16, 33, 99.2, 106

(56) References Cited

U.S. PATENT DOCUMENTS

| | | | | |
|---|---|---|---|---|
| 3,304,111 A | * | 2/1967 | Kauh et al. ................. | 294/99.2 |
| 5,199,756 A | | 4/1993 | Bartlett | |
| 5,209,538 A | * | 5/1993 | Gabruel ........................ | 294/118 |
| 5,868,357 A | * | 2/1999 | Gabriel ..................... | 244/137.1 |
| 6,056,338 A | | 5/2000 | Kerr | |
| 6,089,631 A | * | 7/2000 | Thurlow et al. ............... | 294/16 |
| 6,092,847 A | | 7/2000 | Kwan | |
| 6,179,357 B1 | | 1/2001 | Gabriel | |
| 6,536,819 B2 | * | 3/2003 | Wang et al. ................... | 294/16 |

* cited by examiner

Primary Examiner—Dean J. Kramer
(74) Attorney, Agent, or Firm—Alvin S. Blum

(57) ABSTRACT

Tongs for operations with one hand have a pair of arms hinged at one end. A spring biases the second, grasping ends apart. When the arms are closed, magnetic elements on the inner aspects of the arms together to hold the arms closed and locked. To unlock the arms without the use of another hand or other accessories, a finger or thumb of the holding hand is inserted between the arms, forcing the magnetic elements apart enough to release their hold. A mechanism is provided for inactivating the magnetic lock mechanism when desired.

17 Claims, 3 Drawing Sheets

MAGNETIC LOCKING TONGS

This invention relates to tongs for grasping items, and more particularly to magnetic locking tongs operable with one hand.

BACKGROUND OF THE INVENTION

Kerr, in U.S. Pat. No. 6,056,338 issued May 2, 2000, reviews prior art on the problems encountered with kitchen tongs that have a spring mechanism to keep them open. She reviews the mechanisms for locking them closed when not in use. She teaches a simple movable spring for single handed movement between open and locked closed position. It requires engaging the spring with a stationary hook to close, and pressing the spring against a stationary surface to open. It would be desirable to have a spring-loaded tongs that could be operated with one hand without use of other accessory items.

SUMMARY OF THE INVENTION

It is accordingly an object of the invention to provide a pair of tongs that are spring biased open for grasping use with one hand. It is another object that the tongs can be locked closed and can also be unlocked with the hand holding the tongs without the use of accessory items such as hooks or hard surfaces. The tongs of the invention use a permanent magnet on one arm to hold the other arm closed by magnetic attraction when not in use. The other arm may have a magnet with opposite polarity exposed, or may simply have a ferromagnetic attraction to the magnet. Many methods of disengaging the other arm may be provided. The magnet may be slidably mounted so that it may be moved out of its arm attracting position by a finger motion. The magnet may be springably mounted on an arm so that when the spring is compressed, its potential energy when suddenly released will be converted to kinetic energy of arm motion to force the arms apart from the magnetic hold. In another embodiment, a magnet on the inside of one arm is positioned to cooperate with a magnet or a ferromagnetic portion on the opposite arm to hold the tongs closed when the tongs are manually closed. The magnetic attraction is enough to hold the tongs closed against the spring bias at the pivot end. The magnetic locking is released by forcing a finger or thumb between the legs. By selection of magnet force and dimensions, the force needed to unlock the tongs is easily achieved with the hand holding the tongs. A problem may arise when grasping very thin items. The locking mechanism may undesirably activate by the closed position of the arms. The locking mechanism may be inactivated by sliding the magnet or its attractant element away from registration. These and other objects, features, and advantages of the invention will become more apparent when the detailed description is studied in conjunction with the drawings in which like elements are designated by like reference characters in the various drawing figures.

DETAILED DESCRIPTION OF PREFERRED EMBODIMENTS

Figures 1, 2:
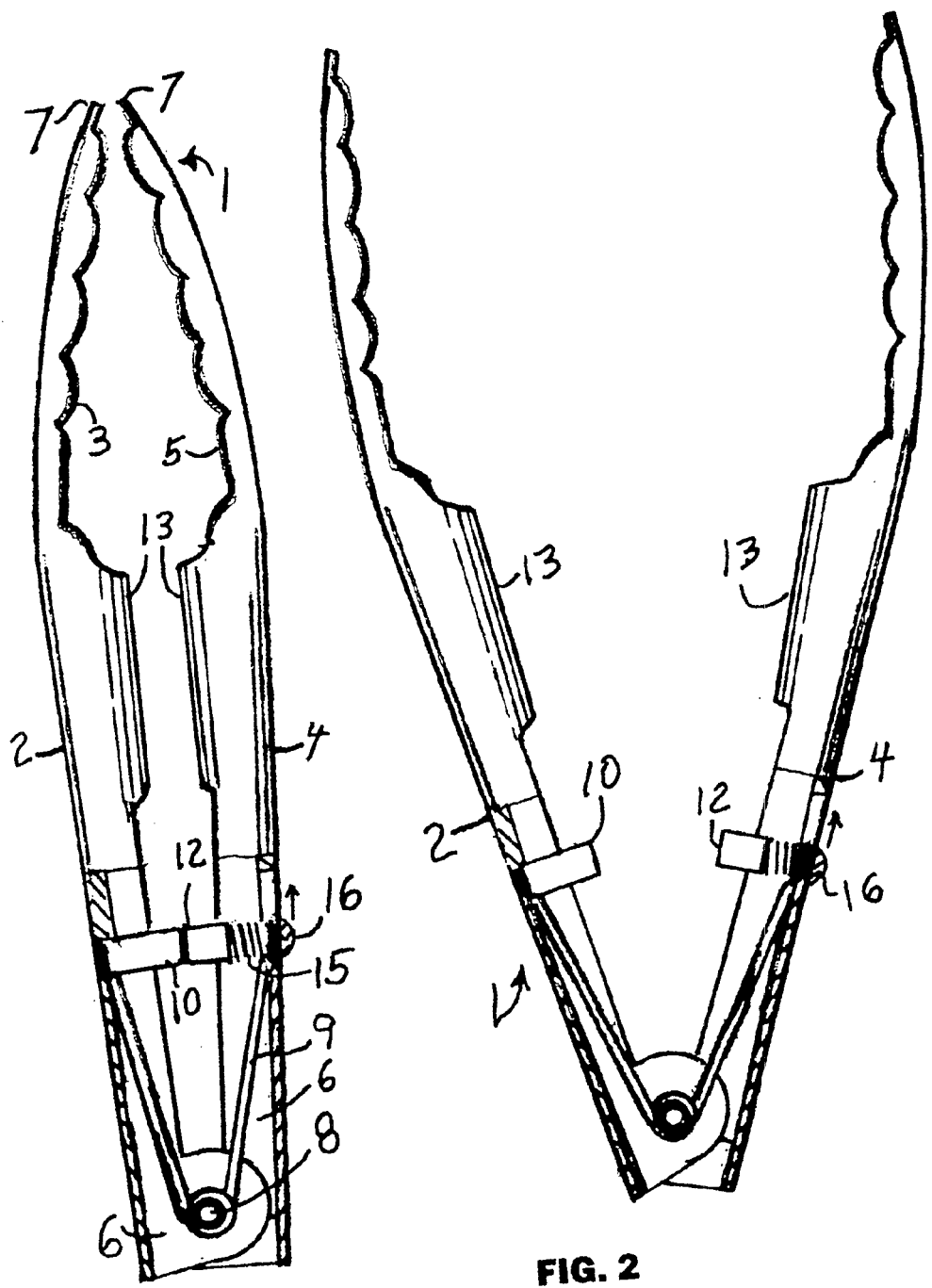
FIG. 1 is a view of the tongs of the invention in locked position, with a portion broken away.
FIG. 2 is a view of the tongs of FIG. 1 in unlocked position, with a portion broken away.
Figure 3:
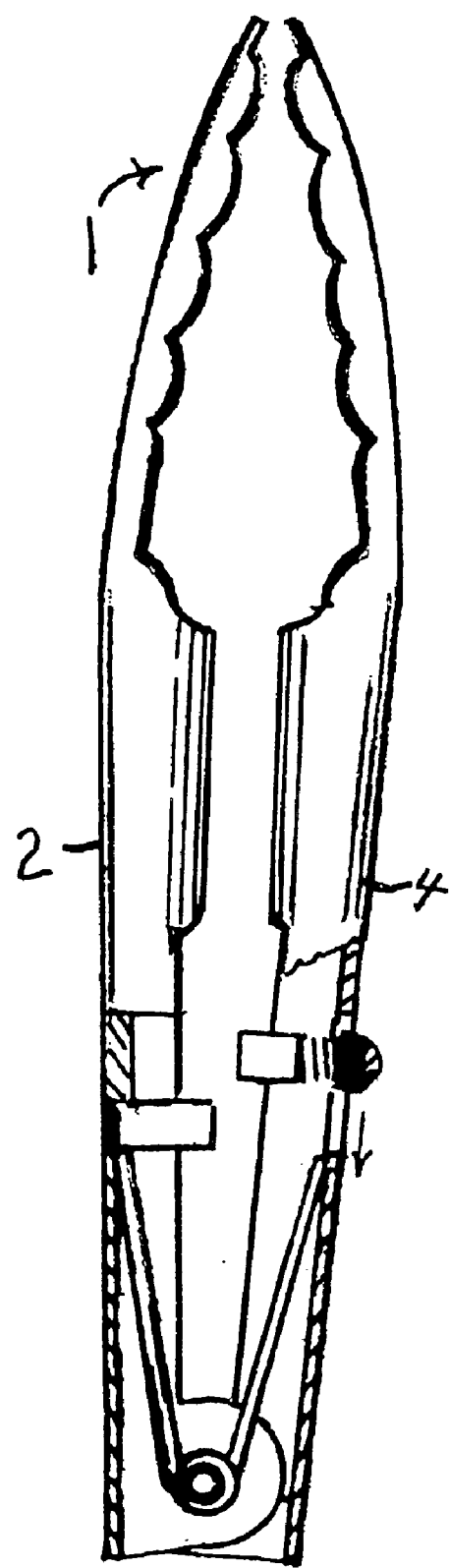
FIG. 3 is a view of the tongs of FIG. 1, with locking mechanism inactivated, and with a portion broken away.

Referring now to the drawing FIGS. 1–3, tongs 1 has a first arm 2 and a second arm 4, having inner aspects 3 and 5 respectively that face each other. Each arm has a hinge end 6, and a grasping end 7. Hinge means 8 pivotably connect the hinge ends so that the inner aspects of the grasping ends 7 can move between the open position of FIG. 2 to the closed position of FIG. 1 to grasp items therebetween. Spring 9 cooperates between the arms to bias the arms to the open position. The hand holding the tongs can squeeze the arms together to grasp items, and relax the grip to enable the spring to spread the arms apart to release items. A permanent magnet 10 is affixed to an inner aspect of one of the arms. A magnet 12 is affixed to an inner aspect of the other of the arms, the magnets being mounted so that they touch each other for maximum holding when the arms are closed. The magnetic attraction is sufficient to overcome the spring bias, to thereby lock the tongs in the closed position for transport and storage. One of the two magnets may be replaced by a portion of ferromagnetic material. To unlock the tongs, a finger or thumb of the hand holding the tongs may be inserted between the arms at the digit insertion areas 13 that are smoothly rounded for easy digit insertion. This forces the arms far enough apart so that the magnetic holding mechanism no longer holds them together. An alternative mechanism for unlocking is provided in this embodiment. One of the magnetic holding elements 12, that may be a magnet or a portion of ferromagnetic material, is mounted by compression spring 15. To unlock, the arms are forced together to compress the spring 15, and then released suddenly. The momentum of the spring generated movement of the spreading arms overcomes the magnetic holding force, and the arms unlock.

A problem may arise when grasping very thin items. The arms will automatically lock when grasping thin items. Then, an unlock maneuver must be employed to release the item. To overcome this problem, the magnetic locking element 12 is slidably mounted on arm 4. The position of element 12 is be controlled by slide button 16 to move from the active locking position of FIGS. 1 and 2 to the inactive locking position of FIG. 3. As best seen in FIG. 3, the magnetic elements 10 and 13 cannot meet, so the arms cannot lock while closing the arms.

Figures 4, 5:
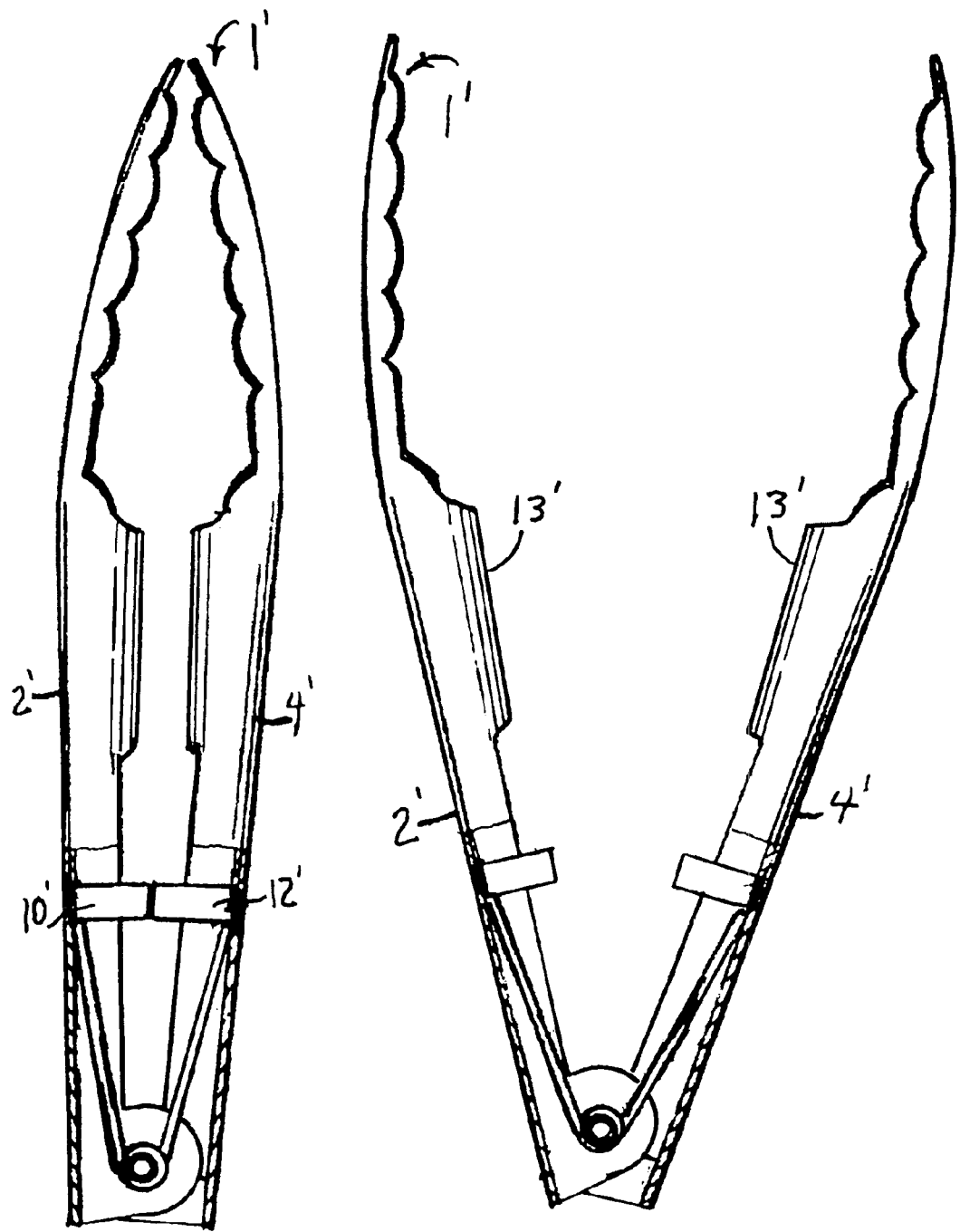
FIG. 4 is view of another embodiment of the invention in unlocked position with a portion broken away.
FIG. 5 is view of the embodiment of FIG. 4 the invention in locked position with a portion broken away.

FIGS. 4 and 5 show an embodiment of the invention 1' in which the magnetic elements 10' and 12' are not spring mounted and unlocking is by forcing a digit between the arms at 13'. These tongs may be effectively employed as kitchen utensils.

While I have shown and described the preferred embodiments of my invention, it will be understood that the invention may be embodied otherwise than as herein specifically illustrated or described, and that certain changes in form and arrangement of parts and the specific manner of practicing the invention may be made within the underlying idea or principles of the invention.

What is claimed is:

1. Lockable tongs with a magnetic locking mechanism, the tongs comprising:

a) a first arm having an inner aspect;

b) a second arm having an inner aspect;

c) each arm comprising a hinge end and a grasping end;

d) hinge means for pivotably connecting said first and second arms together at their respective hinge ends, so that the arms can pivot between an open position and a closed position of the grasping ends;

e) spring means at the hinge means cooperating with the first arm and the second arm for biasing the arms to the open position with a force easily overcome by a hand; and f) a permanent magnet mounted on the inner aspect of one of the arms intermediate the hinge end and the grasping end so as to magnetically engage the other of the arms when the arms are in the closed position with sufficient force to maintain the locked position against the spring means.

2. The tongs according to claim 1 in which the other of the arms is provided with a permanent magnet to cooperate with the permanent magnet on the one of the arms.

3. The tongs according to claim 2 in which the locked position is convertible to the unlocked position by insertion of a digit between the arms.

4. The tongs according to claim 3 in which the locking mechanism is constructed to be manually inactivated when required.

5. The tongs according to claim 2 in which the locking mechanism is constructed to be manually inactivated when required.

6. The tongs according to claim 1 in which the locked position is convertible to the unlocked position by insertion of a digit between the arms.

7. The tongs according to claim 6 in which the locking mechanism is constructed to be manually inactivated when required.

8. The tongs according to claim 1 in which the locking mechanism is constructed to be manually inactivated when required.

9. Lockable kitchen tongs with a magnetic locking mechanism, the tongs comprising:

a) a first arm having an inner aspect;

b) a second arm having an inner aspect;

c) each arm comprising a hinge end and a grasping end;

d) hinge means for pivotably connecting said first and second arms together at their respective hinge ends, so that the arms can pivot between an open position and a closed position of the grasping ends;

e) spring means at the hinge means cooperating with the first arm and the second arm for biasing the arms to the open position with a force easily overcome by a hand; and f) a permanent magnet mounted on the inner aspect of one of the arms intermediate the hinge end and the grasping end so as to magnetically engage the other of the arms when the arms are in the closed position with sufficient force to maintain the locked position against the spring means.

10. The kitchen tongs according to claim 9 in which the other of the arms is provided with a permanent magnet to cooperate with the permanent magnet on the one of the arms.

11. The kitchen tongs according to claim 10 in which the locked position is convertible to the unlocked position by insertion of a digit between the arms.

12. The kitchen tongs according to claim 11 in which the locking mechanism is constructed to be manually inactivated when required.

13. The kitchen tongs according to claim 10 in which the locking mechanism is constructed to be manually inactivated when required.

14. The kitchen tongs according to claim 9 in which the locked position is convertible to the unlocked position by insertion of a digit between the arms.

15. The kitchen tongs according to claim 14 in which the locking mechanism is constructed to be manually inactivated when required.

16. The kitchen tongs according to claim 9 in which the locking mechanism is constructed to be manually inactivated when required.

17. The kitchen tongs according to claim 9 in which the locking mechanism is constructed to be manually inactivated by sliding an element away from magnetic engagement.

* * * * *